(12) United States Patent  
Sun et al.

(10) Patent No.: US 8,638,042 B1  
(45) Date of Patent: Jan. 28, 2014

(54) SYSTEM AND METHOD FOR REGULATING AN OPEN CIRCUIT VOLTAGE OF AN HID LAMP BALLAST

(75) Inventors: Yiyoung Tony Sun, Beverly, MA (US); Kenichi Fukuda, Burlington, MA (US)

(73) Assignee: Universal Lighting Technologies, Inc., Madison, AL (US)

( * ) Notice: Subject to any disclaimer, the term of this patent is extended or adjusted under 35 U.S.C. 154(b) by 599 days.

(21) Appl. No.: 12/979,929

(22) Filed: Dec. 28, 2010

Related U.S. Application Data

(60) Provisional application No. 61/408,343, filed on Oct. 29, 2010.

(51) Int. Cl.  
*G05F 1/00* (2006.01)

(52) U.S. Cl.  
USPC ........ 315/291; 315/307; 315/185 S; 315/312; 315/247

(58) Field of Classification Search  
USPC ................... 315/291, 185 S, 307, 247, 312  
See application file for complete search history.

(56) References Cited

U.S. PATENT DOCUMENTS 5,994,846 A 11/1999 Blankers

*Primary Examiner* — Tuyet Thi Vo  
(74) *Attorney, Agent, or Firm* — Waddey & Patterson, P.C.; Mark J. Patterson

(57) ABSTRACT

A lamp ballast is provided for igniting and operating an HID lamp. A buck inverter circuit includes a pair of high-frequency and a pair of low-frequency switches. A capacitor and an inductor are series-connected between a first node between the low frequency switches and a second node between the high frequency switches. A lamp igniting circuit is coupled between the first node and a first lamp output terminal, and a second lamp output terminal is coupled to a third node between the capacitor and the inductor. A control circuit turns on and off the switches to regulate low frequency square wave voltage generated across the lamp output terminals to be less than an input DC voltage from the positive rail, wherein the buck inverter operates in either of a critical discontinuous mode or a discontinuous mode during an open circuit operation, and in a critical discontinuous mode during other operations.

20 Claims, 9 Drawing Sheets

SYSTEM AND METHOD FOR REGULATING AN OPEN CIRCUIT VOLTAGE OF AN HID LAMP BALLAST

CROSS-REFERENCES TO RELATED APPLICATIONS

This application claims benefit of the following patent application which is hereby incorporated by reference: U.S. Provisional Patent Application No. 61/408,343, filed Oct. 29, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to lamp ballasts and associated methods of operation. More particularly, the present disclosure pertains to a buck inverter topology for a high-intensity discharge (HID) lamp ballast and associated control methods to regulate an open circuit voltage and further prevent current flow through the inverter from being continuous regardless of an operating mode.

The open circuit voltage (OCV) for a high-intensity discharge lamp ballast is generally known in the art to be a primary design parameter. If the OCV is higher than that specified by a lamp manufacturer, lamp stem arcing may occur as a result. If the OCV is lower than that specified, the lamp may not start correctly and shorter lamp life may be another result.

In one method for addressing the OCV design requirements as conventionally known for a low-frequency, square wave HID lamp ballast, a single switch buck regulator is provided in a cascade arrangement with a full bridge, low frequency DC-AC power inverter. The single switch buck regulator regulates its output DC voltage to meet the OCV specification, and the DC-AC inverter follows up by inverting the regulated DC voltage from the single switch buck regulator to a low frequency, square wave AC voltage. In a no-load condition, such as where there is no lamp physically present across lamp output terminals or where a lamp is physically present but has not been ignited, this low frequency, square wave voltage is open circuit voltage (OCV).

There are known advantages and disadvantages for the configuration discussed above. For example, the configuration allows for easy control of the OCV because the buck regulator is separated from the low-frequency DC-AC square wave inverter, and further allows for easy control of lamp power by the buck regulator itself. During a lamp ignition operation, the buck regulator operates in a fixed-frequency discontinuous conduction mode. During lamp run-up operation, the buck regulator operates in continuous conduction mode (i.e., the inductor current flows continuously and never goes to zero) because the lamp voltage is very low. During normal (also referred to as steady-state) lamp operation, the buck regulator operates in either a fixed-frequency discontinuous mode or a variable-frequency critical discontinuous conduction mode to maximize circuit efficiency.

However, the cost of such a design is relatively high because the configuration needs five switches to implement the stated operations. Also, during lamp run-up operations the circuit is in continuous mode, which lowers the circuit efficiency. In some circumstances the lamp may remain in a run-up operation for an extended period of time, and care must accordingly be taken to dissipate heat from the buck switch and/or other power devices.

Another common configuration, such as for example an HID lamp ballast 1 as shown in FIG. 1, is to provide a buck DC-AC inverter 1 having four switches Q1 to Q4 arranged in a full bridge configuration between positive and negative inverter rails 24, 26 for regulating power to an HID lamp. A buck capacitor C1 and a buck inductor L1 are coupled in series between output terminals for the switches, or in other words between a first node between switches Q1, Q2 and a second node between switches Q3, Q4. An ignition circuit 12 is also coupled on a first end to the node between switches Q1, Q2. A first lamp output terminal X1 is coupled to a second end of the ignition circuit 12 and a second lamp output terminal X2 is coupled to a node between the buck capacitor C1 and the buck inductor L1. A current sensor 16 is provided, in the example shown a resistor R1 coupled to the negative rail 26. A control circuit 14 receives feedback inputs from the inverter 10 and provides control signals to the switches Q1-Q4 via switch drivers 15a, 15b.

The control circuit 14 in the example shown includes a turn-off detection circuit 18 arranged to detect a peak current via the current sensor 16, a turn-on detection circuit 20 (i.e., edge detection circuit) arranged to detect positive/rising edges and negative/falling edges of a voltage waveform at the second node between switches Q3, Q4, and a logic control flip-flop 22 or equivalent circuitry to receive outputs from the turn on detection circuit 20 and the turn off detection circuit 18 and provide appropriate signals to the switch drivers 15a, 15b.

One primary shortcoming of the conventional configuration shown in FIG. 1 is that the open circuit voltage is not regulated. In other words, the open circuit voltage is equivalent to the voltage V_c1 across the buck capacitor C1 and as shown further has the same value (VDC) as that provided on the positive rail 24. The range of the positive DC rail voltage is largely restricted by the input line voltage or the front-end power factor correction circuit.

Referring to FIG. 2, the voltage V_c1 across the buck capacitor C1 is shown during a no-load condition. The voltage V_c1 across the buck capacitor C1 changes in polarity at a low frequency. The absolute peak of the buck capacitor voltage V_c1 is substantially the same as the voltage VDC on the positive rail 24.

BRIEF SUMMARY OF THE INVENTION

A buck inverter topology for a high-intensity discharge lamp ballast and associated methods of operation are described herein for providing an open circuit voltage (OCV) to lamp output terminals having an RMS value measurably lower than an input DC voltage VDC.

In various embodiments the buck inverter is controlled such that the current flowing through an associated buck inductor is not continuous during any operating mode.

In various embodiments the open circuit voltage may be further regulated to be sufficiently low wherein stem arcing is substantially prevented, yet sufficiently high that a superimposed ignition voltage over the open circuit voltage is adequate to ignite and run-up an HID lamp coupled to the lamp output terminals of the HID lamp ballast.

In an embodiment, a lamp ballast is provided in accordance with the present disclosure for igniting and operating a high-intensity discharge lamp. A buck inverter circuit includes a pair of high-frequency and a pair of low-frequency switches. A capacitor and an inductor are series-connected between a first node between the low frequency switches and a second node between the high frequency switches. A lamp igniting circuit is coupled between the first node and a first lamp output terminal, and a second lamp output terminal is coupled to a third node between the capacitor and the inductor. A control circuit turns on and off the switches based on feedback signals and an inverter operation, wherein the buck inverter operates in a critical discontinuous mode during lamp startup, lamp run-up and stable lamp operations, and further operates in either of a critical discontinuous mode or a discontinuous mode during an open circuit operation.

In another embodiment of a lamp ballast in accordance with the present disclosure, a buck inverter is provided with a pair of high frequency switching elements and a pair of low frequency switching elements arranged in a full bridge configuration between positive and negative rails of the ballast. A capacitor and an inductor are coupled in series between a first node between the low frequency switching elements and a second node between the high frequency switching elements. A first lamp output terminal is coupled to the first node, and a second lamp output terminal is coupled to a third node between the capacitor and the inductor. A sense resistor is coupled to the negative rail. A control circuit during an open circuit operation senses rising and falling edges of a voltage waveform at the second node, and generates ON signals to one or more switching elements in response to the sensed rising and falling edges. The control circuit during the open circuit operation further senses one or more of a peak current through a current sensor and an over-voltage condition across the capacitor, and generates OFF signals to the high frequency switching elements in response to the sensed peak current and/or over-voltage condition. Alternatively, the control circuit generates OFF signals to the low frequency switching elements in response to a predetermined time elapsing without an OFF signal being generated to the high frequency switching elements. The buck inverter circuit therefore operates in either of a critical discontinuous mode or a discontinuous mode during the open circuit operation.

In another embodiment, a method is provided of controlling a buck inverter in a high-intensity discharge lamp ballast to regulate a voltage across first and second lamp output terminals during an open circuit operation. Rising and falling edges of a voltage waveform are sensed at a node between a pair of high frequency switching elements, which along with a pair of low frequency switching elements are arranged in a full bridge configuration and coupled between positive and negative inverter rails. ON signals are generated to one or more switching elements in response to the sensed rising and falling edges. A peak current through a current sensor coupled to the negative rail and/or a voltage fault condition at the second lamp output terminal are sensed by control circuitry, whereby OFF signals are generated to the high frequency switching elements in response to the sensed peak current and/or voltage fault condition. Alternatively, OFF signals are generated to the low frequency switching elements in response to a predetermined time elapsing without an OFF signal being generated to the high frequency switching elements. The buck inverter circuit thereby operates in either of a critical discontinuous mode or a discontinuous mode during the open circuit operation.

DETAILED DESCRIPTION OF THE INVENTION

Figure 1:
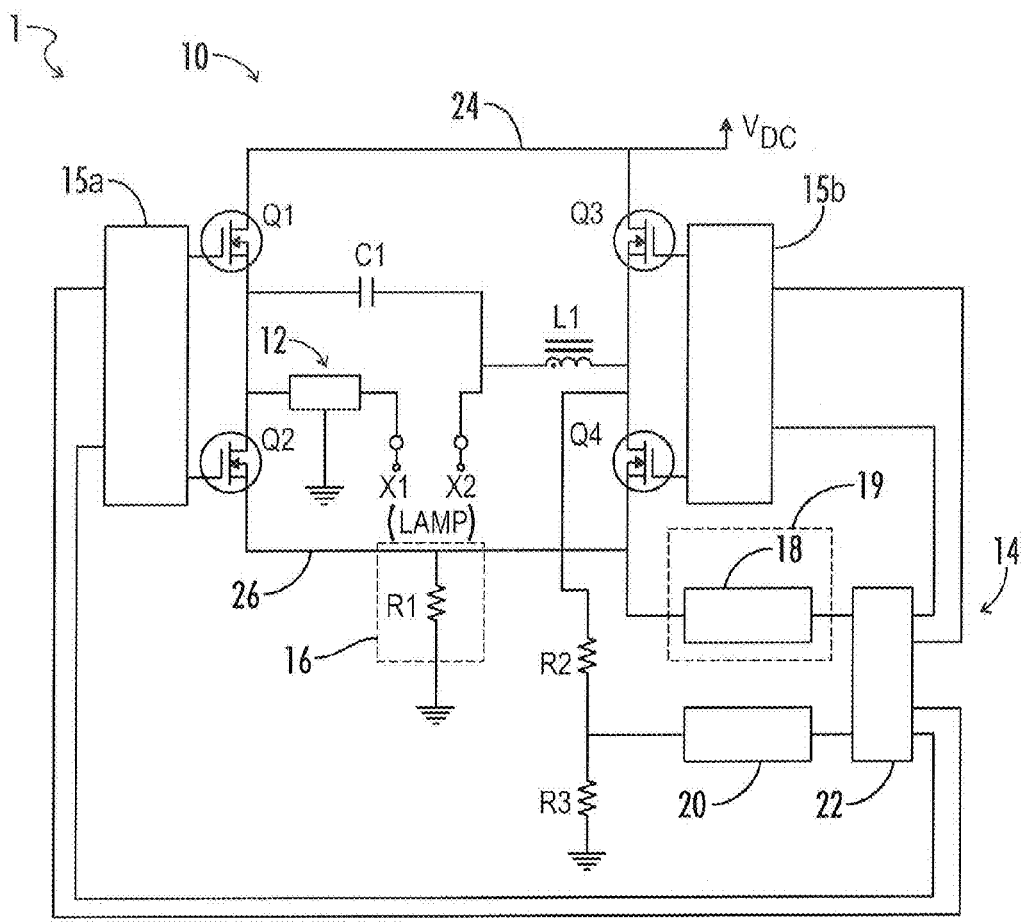
FIG. 1 is a circuit block diagram representing a lamp ballast as previously known in the art.
Figure 2:
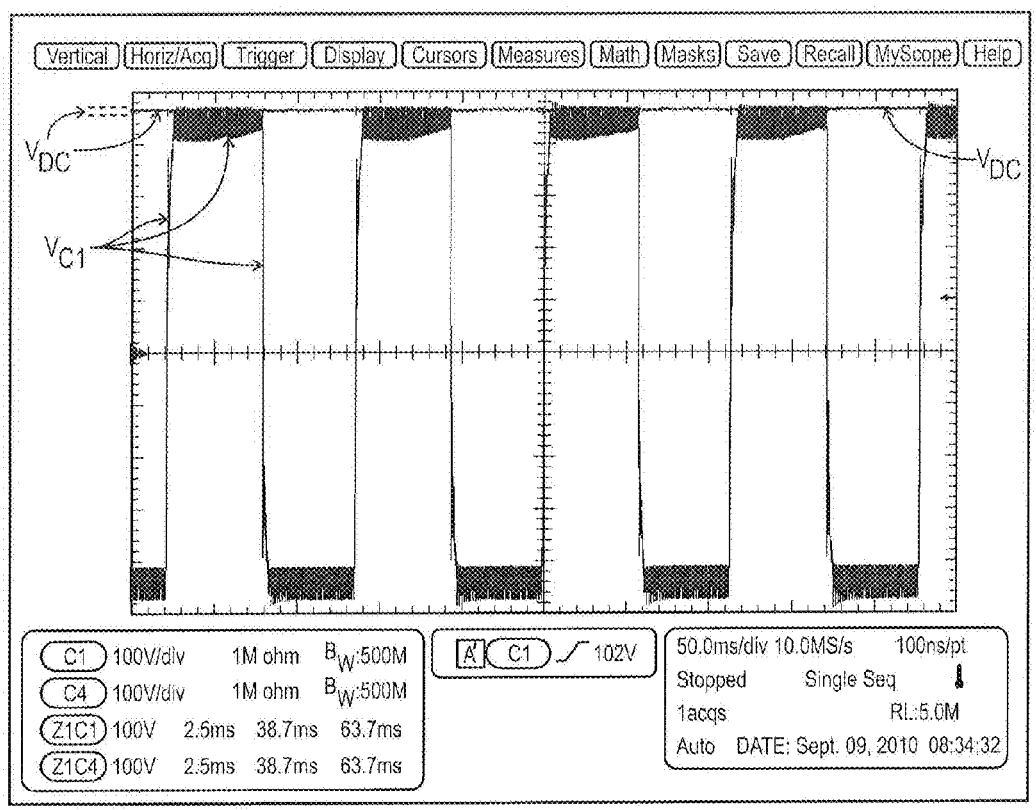
FIG. 2 is a graphical diagram representing voltage waveforms from an operation of the lamp ballast of FIG. 1.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Referring generally to FIGS. 3 to 7, embodiments of systems and methods in accordance with the present disclosure may be described herein in some detail. Where the various figures may describe embodiments sharing various common elements and features with other embodiments, similar elements and features are given the same reference numerals and redundant description thereof may be omitted below.

Figure 3:
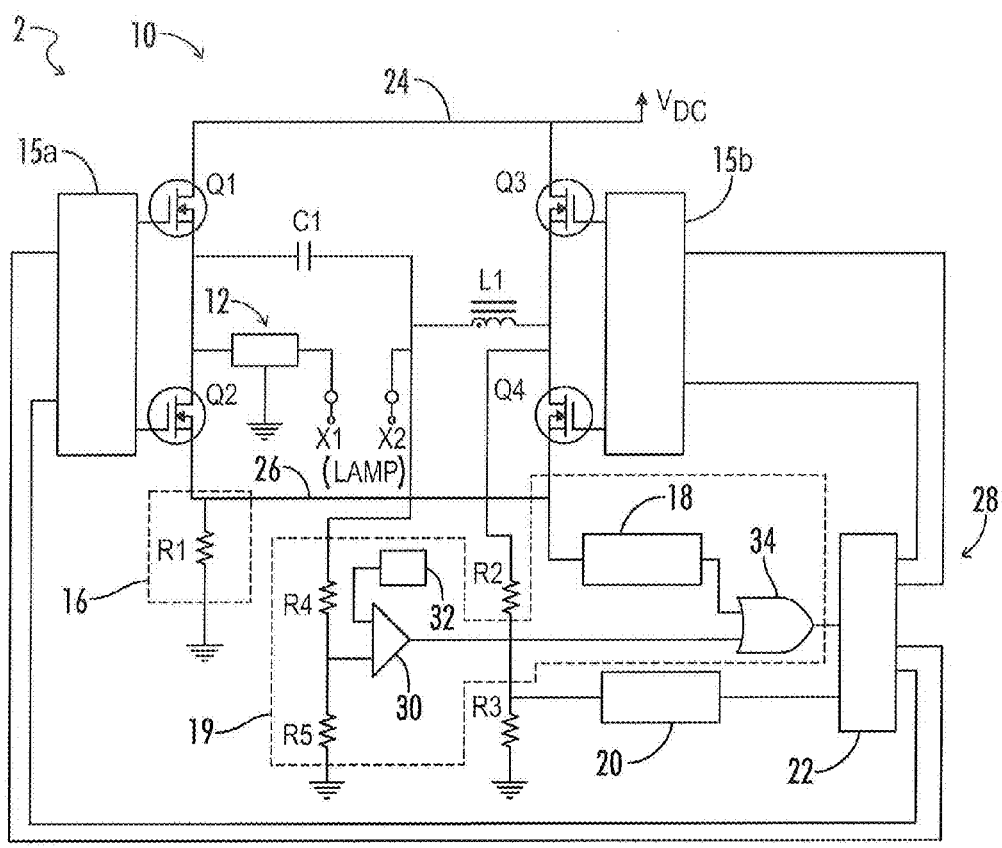
FIG. 3 is a circuit block diagram representing an embodiment of a lamp ballast in accordance with the present disclosure.

Referring first to FIG. 3, an embodiment of an HID lamp ballast 2 is physically arranged in like manner to that of the conventional ballast 1 shown in FIG. 1, with certain exceptions as described herein. A pair of resistors R4, R5 are coupled in series between the second lamp output terminal X2 and an inverter ground. A node between the resistors R4, R5 (defining a voltage divider) is coupled to a first input of an amplifier 30, and a phase control reference signal is coupled to a second input of the amplifier 30, such that an output from the amplifier 30 is indicative of a buck capacitor voltage V_c1 with respect to the reference voltage. An OR logic circuit 34 is arranged to receive a first input from the peak current detection circuit 18 as described in the conventional ballast of FIG. 1, and a second input from the amplifier 30.

The peak current detection circuit 18, voltage dividing resistors R4, R5, amplifier 30 with phase control reference, and logic circuitry 34 may therefore collectively define a turn off detection circuit with respect to an embodiment of a lamp ballast 2 as shown in FIG. 3, in contrast with the turn off detection circuit from the conventional ballast 1 which includes only the peak current detection circuit 18.

Figure 4:
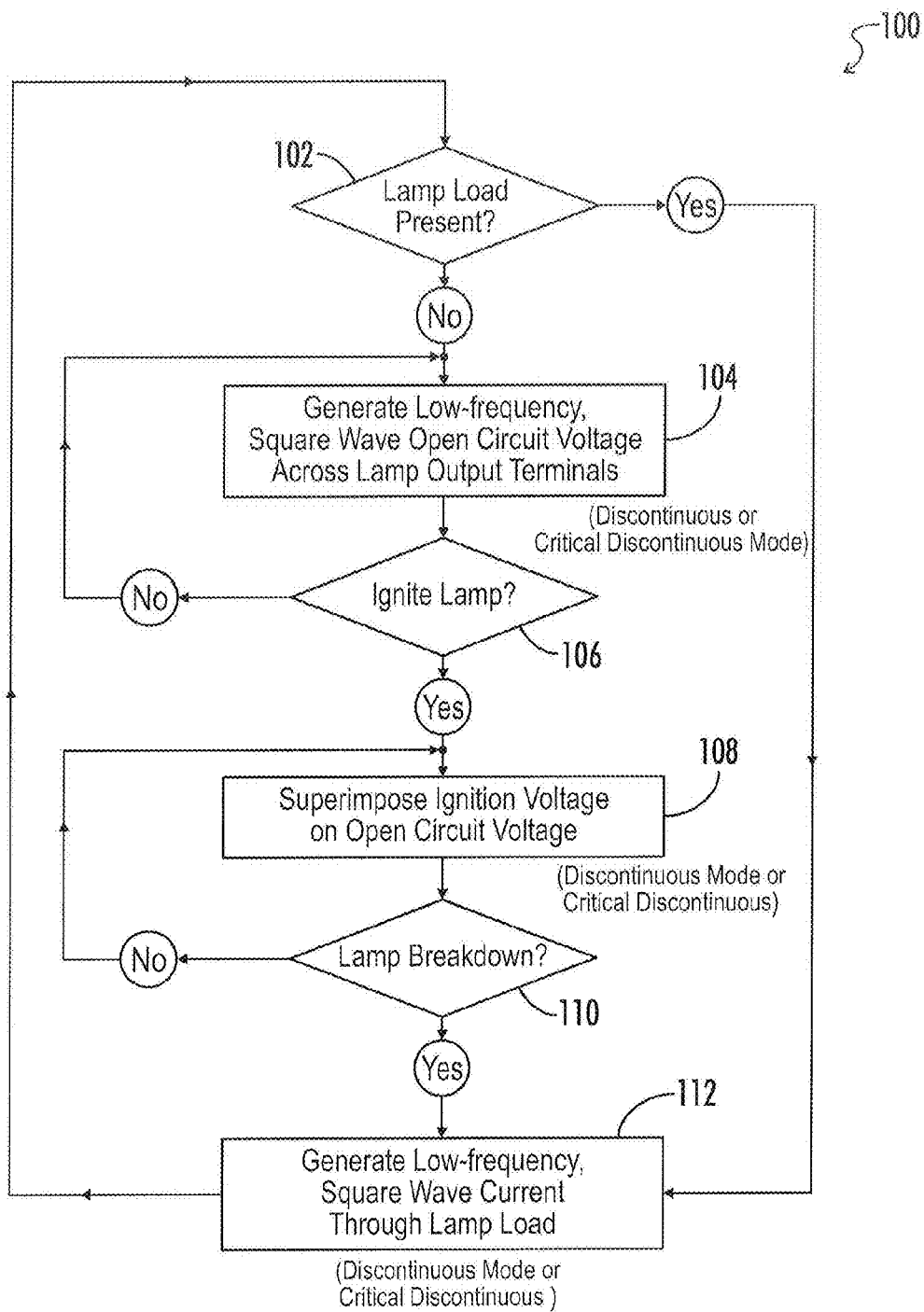
FIG. 4 is a flowchart representing an embodiment of a method of operation for the lamp ballast of FIG. 3

Referring next to FIG. 4, an embodiment of a method 100 for controlling and operating a lamp ballast 2 in accordance with the present disclosure may now be described.

As a first step 102, a determination may be made as to whether a lamp load is present across the lamp output terminals X1, X2 of the buck inverter 10. A no-load condition in this step may be associated with at least a lamp not being physically present and coupled to the lamp output terminals X1, X2 or a lamp being physically coupled to the lamp output terminals X1, X2 but not yet ignited, either of which present the equivalent of an open circuit across the terminals. Where a no-load condition is not determined ("yes" in FIG. 4), the method 100 may skip the no-load and ignition operating procedures and proceed to step 112 as described below. Where a no-load condition is determined, however ("no" in FIG. 4), and mains power is being provided to the ballast 2 and more particularly an input DC voltage is present on the positive rail of the buck inverter 10, a no-load operation may be initiated such that the open circuit voltage (OCV) is regulated across the output terminals X1, X2.

In the no-load control operation (step 104), buck inverter low-frequency switches Q1, Q2 and high-frequency switches Q3, Q4 are controlled to be turned on and off such that a low frequency, square wave voltage is generated across the lamp output terminals X1, X2. The amplitude of the square wave voltage may be sufficiently low that the potential for stem arcing is substantially reduced or even prevented. In various embodiments of the no-load control operation, the inverter switches Q1 to Q4 are controlled such that the buck inverter 10 operates only in a fixed frequency discontinuous conduction mode or a variable frequency critical (discontinuous) conduction mode, but never in a continuous mode.

Figure 5:
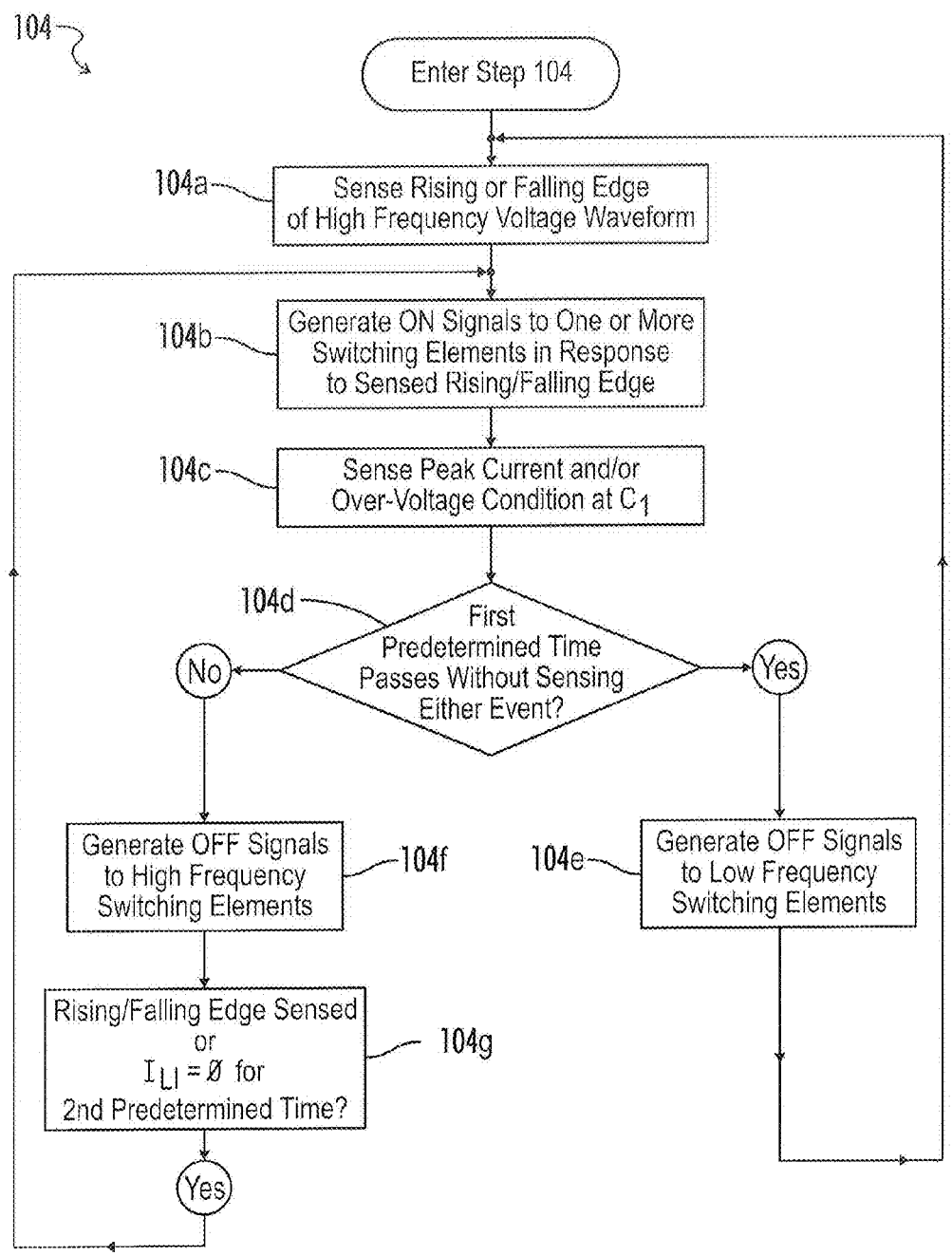
FIG. 5 is a flowchart representing another embodiment of a method of operation for the lamp ballast of FIG. 3.

An embodiment of a no-load operation (i.e., step 104 of the method 100) may be described in greater detail with reference to FIG. 5. Steps 104a to 104g are represented generally with respect to either or both a first half and a second half of a low-frequency voltage cycle during the no-load operation, as the steps are substantially similar in each half although different inverter switches may be controlled in association with a particular half-cycle. For example, in an embodiment as described below, low frequency switch Q1 and high frequency switch Q4 may be active during a first half of a low frequency cycle in the open circuit voltage waveform, while low frequency switch Q2 and high frequency switch Q3 may be active during a second half of the low frequency cycle.

Beginning with an example of a first half of the low frequency cycle, switch Q1 may generally be turned on during the cycle while switch Q4 is turned on and off. The turn-on detection circuit 20 senses a falling edge in the voltage waveform at the node between switches Q3, Q4 (via the voltage divider R2, R3) and generates an ON signal such as for example a digital pulse output to the logic control circuit 22 (step 104a). The "falling edge" in an embodiment as described herein may further generally be associated with a zero crossing of the buck inductor current (IL1) having a downward slope. Upon receiving an ON signal from the turn on detection circuit 20, the logic control circuit 22 generates corresponding ON signals to the switch drivers 15a, 15b, which respond by controlling low frequency switch Q1 and high frequency switch Q4 to be turned on simultaneously (step 104b). The logic control circuit 22 in an embodiment may be a logic-controlled flip flop or other equivalent circuitry as would be understood by one of skill in the art.

After the switches Q1, Q4 are turned on, the controller 28, and more particularly the turn-off detection circuit 19, then is capable of determining whether a peak current has been reached through the current sensor (i.e., sense resistor R1) and/or whether an under-voltage condition is present on the second lamp output terminal X2 (step 104c). Because the positive DC rail voltage VDC is regulated by the power factor correction circuit, an under-voltage condition at the second lamp output terminal X2 means an over-voltage condition is present across the buck capacitor C1 because (Vc1=VDC−Vx2). In a no-load operation the buck capacitor voltage Vc1 is therefore equivalent to the open circuit voltage. In either case, where a peak current is detected by the peak current sensor 18 or an under-voltage condition is detected at the second lamp output terminal X2 (i.e., an over-voltage condition across the buck capacitor C1) by the amplifier 30, an output signal is provided to the logic OR circuit 34 wherein an OFF signal is generated to the logic control circuit 22.

The logic control circuit 22 may in various embodiments (in step 104d) be programmed to count an amount of time that passes between an ON signal being generated to switches Q1, Q4 and an OFF signal being received from the logic OR circuit 34 (and generally from the turn off detection circuit 19).

If the amount of time without an OFF signal being received from the turn off detection circuit 19 exceeds a predetermined amount of time ("yes" to the query in step 104*d* from FIG. 5), the logic control circuit 22 may generate an OFF signal to the low frequency switch Q1 (via the switch driver 15*a*) and return to step 104*a*, or otherwise maintain the switch Q1 in an OFF position for the duration of the first half of the low frequency cycle.

If the amount of time without an OFF signal being received from the turn off detection circuit 19 is less than the predetermined amount of time ("no" to the query in step 104*d* from FIG. 5), the logic control circuit 22 may generate an OFF signal to the high frequency switch Q4 (via the switch driver 15*b*).

Rather than simply return to step 104*a* and await another falling edge in the high frequency voltage waveform after the high frequency switch Q4 has been turned off, in various embodiments the method may include a step (step 104*g*) of detecting either of a falling edge of the high frequency voltage waveform at the node between switches Q3, Q4 (i.e., a zero crossing of the buck inductor current IL1), or the buck inductor current IL1 being equal to zero for a predetermined period of time, in which case the method returns to step 104*b* and an ON signal is generated to the high frequency switch Q4 (via the switch driver 15*b*) and to the low frequency switch Q1 (via the switch driver 15*a*). In various embodiments, the high frequency switch Q4 may be kept off for an indeterminate period of time until either of the above-recited conditions is met to provide an ON signal, but in addition if the control circuit 28 and more particularly the turn off detection circuit 19 continues to generate OFF signals the high frequency switch Q4 will be kept off anyway, regardless of the presence of a condition which would otherwise result in the switch Q4 being turned on.

In an embodiment of an operation during the first half of a low frequency cycle as recited above, the buck inverter thereby may be controlled to operate either in a discontinuous conduction mode or a variable frequency critical (discontinuous) conduction mode, but not in a continuous conduction mode.

Continuing with an example of a second half of the low frequency cycle, switch Q2 may generally be turned on during the cycle while switch Q3 is turned on and off. The turn-on detection circuit 20 senses a rising edge in the voltage waveform at the node between switches Q3, Q4 (via the voltage divider R2, R3) and generates an ON signal such as for example a digital pulse output to the logic control circuit 22 (also step 104*a* from FIG. 5, as the steps are commonly recited for each half-cycle as further described above). The "rising edge" in an embodiment as described herein may further generally be associated with a zero crossing of the buck inductor current (IL1) having a upward slope. Upon receiving an ON signal from the turn on detection circuit 20, the logic control circuit 22 generates corresponding ON signals to the switch drivers 15*a*, 15*b*, which respond by controlling low frequency switch Q2 and high frequency switch Q3 to be turned on simultaneously (step 104*b*).

After the switches Q2, Q3 are turned on the controller 28, and more particularly the turn off detection circuit 19, then is capable of determining whether a peak current has been reached through the current sensor (i.e., sense resistor R1) and/or whether an over-voltage condition is present on the second lamp output terminal X2 (step 104*c*). An over-voltage condition at the second lamp output terminal X2 during the second half of the low frequency cycle means that an over-voltage condition is present across the buck capacitor C1 because (Vc1=Vx2). In the second half of the low frequency cycle during a no-load operation, the buck capacitor voltage Vc1 is therefore still equivalent to the open circuit voltage. As before, where a peak current is detected by the peak current sensor 16 or an over-voltage condition is detected at the second lamp output terminal X2 (i.e., an over-voltage condition across the buck capacitor C1) by the amplifier 30, an output signal is provided to the logic OR circuit 34 wherein an OFF signal is generated to the logic control circuit 22.

The logic control circuit 22 may in various embodiments (in step 104*d*) be programmed to count an amount of time that passes between an ON signal being generated to switches Q2, Q3 and an OFF signal being received from the logic OR circuit 34 (and generally from the turn off detection circuit 19).

If the amount of time without an OFF signal being received from the turn off detection circuit 19 exceeds a predetermined amount of time ("yes" to the query in step 104*d* from FIG. 5), the logic control circuit 22 may generate an OFF signal to the low frequency switch Q2 (via the switch driver 15*a*) and return to step 104*a*, or otherwise maintain the switch Q2 in an OFF position for the duration of the second half of the low frequency cycle.

If the amount of time without an OFF signal being received from the turn off detection circuit 19 is less than the predetermined amount of time ("no" to the query in step 104*d* from FIG. 5), the logic control circuit 22 may generate an OFF signal to the high frequency switch Q3 (via the switch driver 15*b*).

As previously stated with respect to the first half of the low frequency cycle, the method may include a step (step 104*g*) of detecting either of a rising edge of the high frequency voltage waveform at the node between switches Q3, Q4 (i.e., a zero crossing of the buck inductor current IL1 in the positive direction), or the buck inductor current IL1 being equal to zero for a predetermined period of time, in which case the method returns to step 104*b* and an ON signal is generated to the high frequency switch Q3 (via the switch driver 15*b*) and to the low frequency switch Q2 (via the switch driver 15*a*). In various embodiments, the high frequency switch Q3 may be kept off for an indeterminate period of time until either of the above-recited conditions is met to provide an ON signal, but in addition if the control circuit 28 and more particularly the turn off detection circuit 19 continues to generate OFF signals the high frequency switch Q3 will be kept off anyway, regardless of the presence of a condition which would otherwise result in the switch Q3 being turned on.

In an embodiment of an operation during either half of a low frequency cycle as recited above, the buck inverter thereby may be controlled to operate either in a discontinuous conduction mode or a variable frequency critical (discontinuous) conduction mode, but not in a continuous conduction mode.

Figure 6:
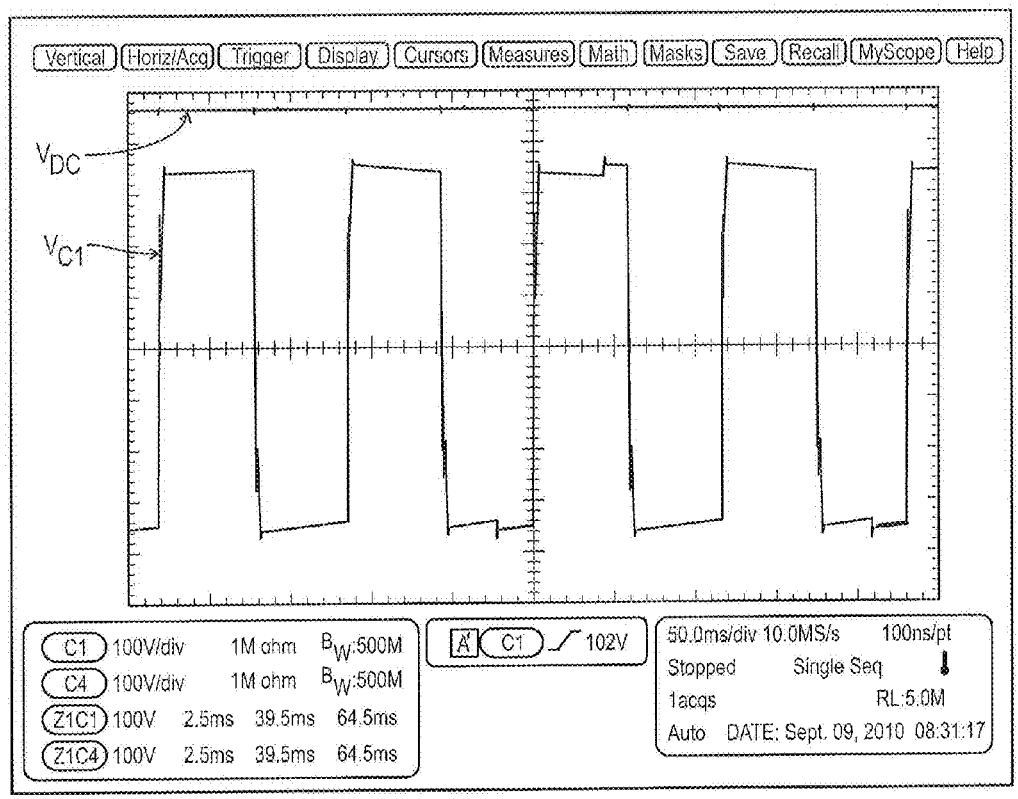
FIG. 6 is a graphical diagram representing voltage waveforms from an exemplary operation of the lamp ballast of FIG. 3 having no load.

Referring to FIG. 6, the buck capacitor voltage Vc1 is represented during a no-load operation with respect to an embodiment of the present disclosure. The buck capacitor voltage Vc1 as shown is regulated to be measurably lower than the positive DC rail voltage Vdc by the open circuit voltage controller 28 of the HID lamp ballast 2 as provided herein.

Figure 7A:
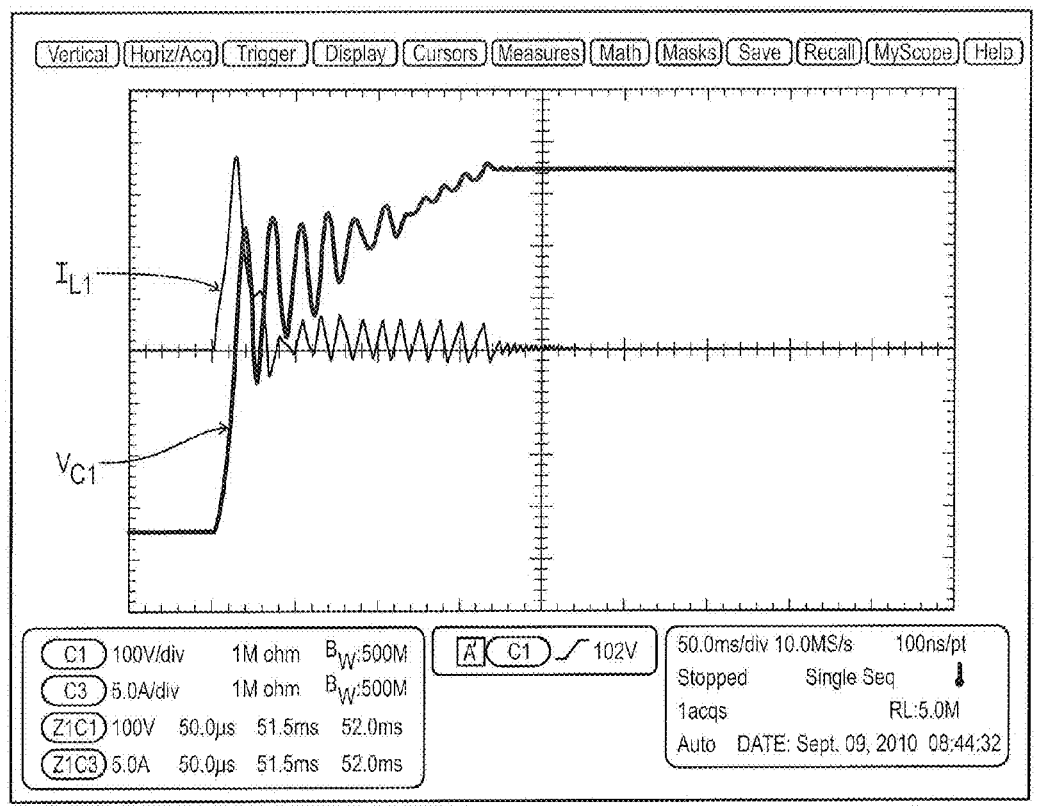
FIG. 7a is a graphical diagram representing inductor current and capacitor voltage waveforms from an exemplary operation of the lamp ballast of FIG. 3 having no load.
Figure 7B:
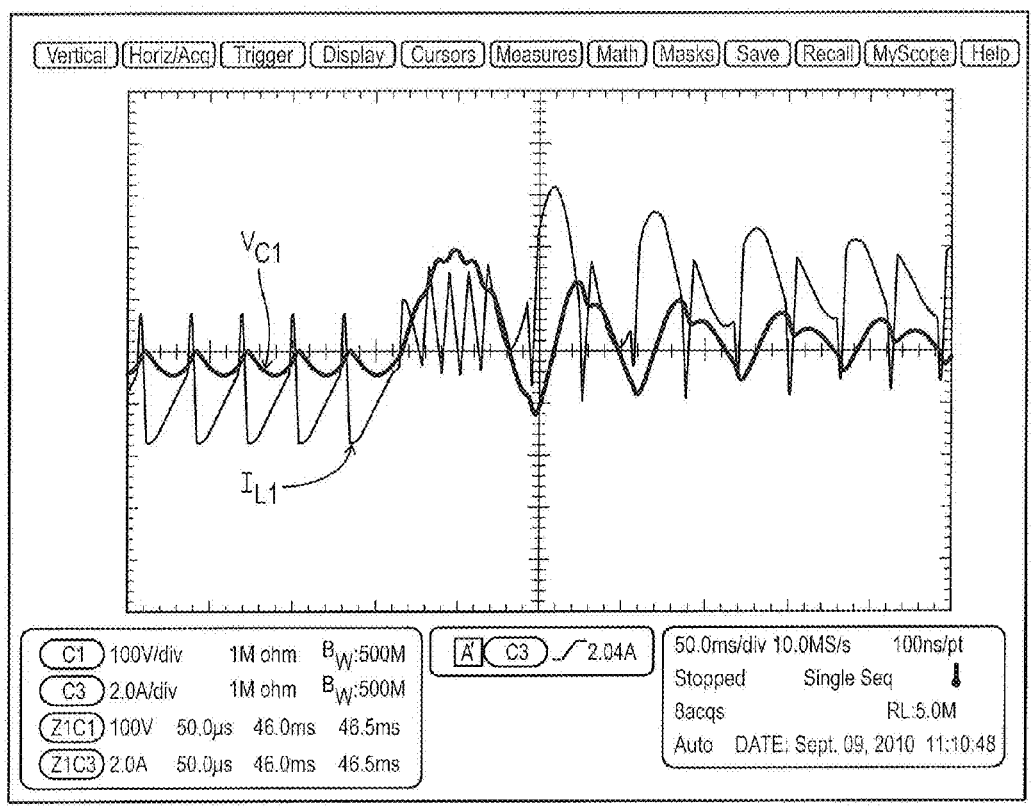
FIG. 7b is a graphical diagram representing inductor current and capacitor voltage waveforms from an exemplary operation of the lamp ballast of FIG. 3 during lamp-up.
Figure 7C:
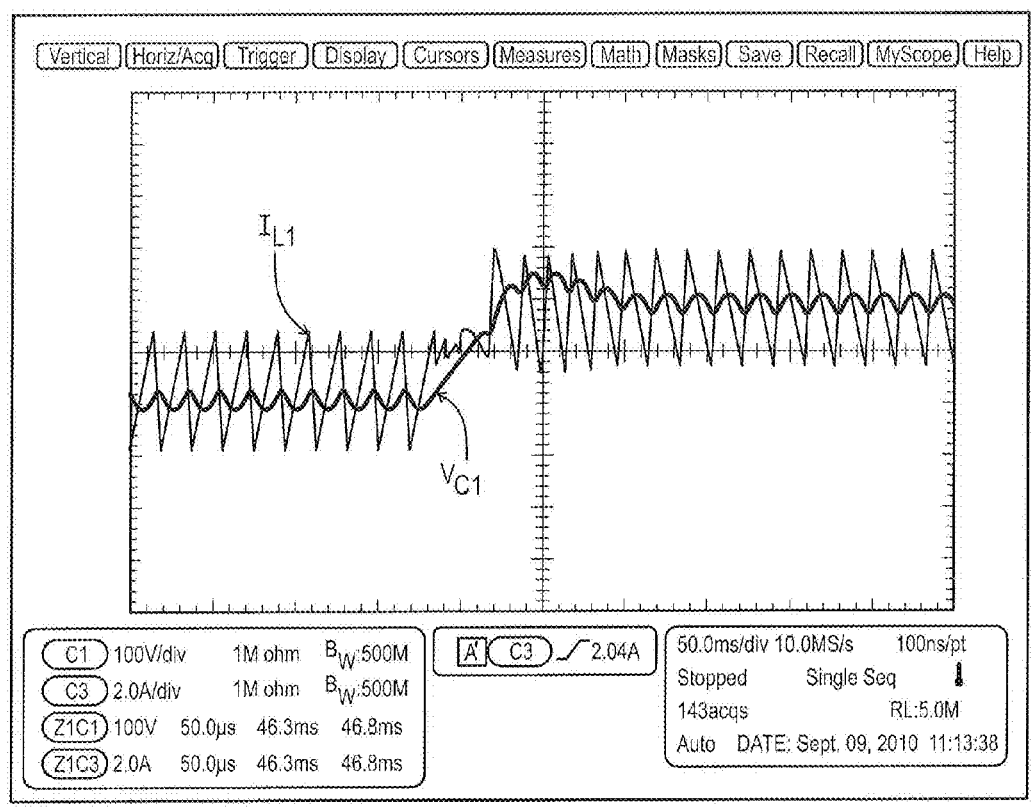
FIG. 7c is a graphical diagram representing inductor current and capacitor voltage waveforms from an exemplary operation of the lamp ballast of FIG. 3 during normal lamp operation.

Referring to FIG. 7*a*, the buck inductor current IL1 and the buck capacitor voltage Vc1 are represented at the beginning of a low frequency cycle during an exemplary no-load operation in accordance with the present disclosure. The buck inductor current IL1 is initially in critical discontinuous mode and charging up the buck capacitor C1, after which the current IL1 goes into a relatively long OFF period due to operation of the open circuit voltage control method.

Returning now to FIG. 4, after a full low frequency cycle is complete the method may continue by determining whether or not the ballast 2 is to enter a lamp ignition mode (step 106). If not (i.e., "no" in response to the query in step 106), the method returns to step 104 and initiates a new low frequency cycle of open circuit voltage control operation. If it is determined that a lamp ignition mode is to begin (i.e., "yes" in response to the query in step 106), whether from an external command or otherwise, the method continues to step 108 and superimposes an ignition voltage from the igniter circuit 12 over the open circuit voltage across the lamp output terminals X1, X2 so as to ignite the lamp. In various embodiments the ignition voltage may be of a high voltage pulse-type or a resonant-type as may be provided from for example a resonant circuit when the inverter operating frequency is adjusted during the lamp ignition mode to a frequency near a resonant frequency for the resonant circuit.

If lamp breakdown is not completed during a first duration of the lamp ignition mode ("no" in response to the query of step 110), the method may return to step 108 and continue to superimpose an ignition voltage over the open circuit voltage. Alternatively, in various embodiments the controller 28 may be configured to determine whether a number of attempts exceeds a predetermined maximum number of attempts to ignite the HID lamp, after which the ballast 2 may be shut down.

If lamp breakdown is otherwise achieved during the lamp ignition mode ("yes" in response to the query of step 110), the method continues to step 112 and generates a low frequency, square wave current through the lamp load via lamp output terminals X1, X2. In various embodiments the buck inverter 10 may enter a lamp run-up mode immediately after lamp ignition, during which time the lamp warms up. After the lamp run-up mode, the buck inverter 10 may enter a normal lamp operating mode (i.e., steady-state mode), and the method returns to step 102 to determine whether or not a lamp load is still present across the lamp output terminals X1, X2.

During lamp run-up and normal lamp operation, the open circuit voltage controller 28 in various embodiments will generally not generate any OFF signals as a result of an overvoltage condition detected by the amplifier 30 because the buck capacitor voltage Vc1 will be relatively low. The OFF signal may therefore be exclusively generated by the peak current detected by the current sensor 16 (i.e., flowing through the sense resistor R1). The ON signal during the lamp run-up and normal lamp operations may be generated by the turn on detection circuit in the same manner as in a no-load operation.

The buck inverter 10 in both of the lamp run-up and normal lamp operations also operates in either of a discontinuous conduction mode or a variable frequency critical discontinuous mode, but not in continuous mode, similarly to the no-load operation.

Referring to step 7b, a buck inductor current IL1 and buck capacitor voltage Vc1 are represented at the beginning of an exemplary low frequency cycle during an embodiment of a lamp run-up operation in accordance with the present disclosure. In the example shown, the buck inductor current IL1 is always critical discontinuous.

Referring to step 7c, a buck inductor current IL1 and buck capacitor voltage Vc1 are represented at the beginning of an exemplary low frequency cycle during an embodiment of a normal lamp operation in accordance with the present disclosure. In the example shown, the buck inductor current IL1 is always critical discontinuous.

Thus, although there have been described particular embodiments of the present invention of a new and useful "System and Method for Regulating an Open Circuit Voltage of an HID Lamp Ballast," it is not intended that such references be construed as limitations upon the scope of this invention except as set forth in the following claims.

What is claimed is:

1. A lamp ballast comprising:
a buck inverter circuit having a pair of high frequency switching elements and a pair of low frequency switching elements arranged in a full bridge configuration between positive and negative rails of the ballast;
a capacitor and an inductor coupled in series between a first node between the low frequency switching elements and a second node between the high frequency switching elements;
a lamp igniting circuit at least coupled between the first node and a first lamp output terminal, a second lamp output terminal being coupled to a third node between the capacitor and the inductor; and
a control circuit having inputs coupled to the second node, the third node and the negative rail, and effective to turn on and off the switching elements based on an inverter operation, the control circuit further effective during an open circuit operation to regulate a low frequency square wave voltage generated across the first and second output terminals to be less than an input DC voltage from the positive rail,
wherein the buck inverter operates in either of a critical discontinuous mode or a discontinuous mode during an open circuit operation.

2. The lamp ballast of claim 1, the control circuit being effective to turn on and off the switching elements during lamp startup, lamp run-up and stable lamp operations such that the buck inverter operates in a critical discontinuous mode.

3. The lamp ballast of claim 1, wherein during a lamp startup operation an ignition voltage is generated and superimposed on the low frequency square wave voltage.

4. The lamp ballast of claim 3, wherein during a lamp run-up operation which occurs after lamp breakdown a low frequency square wave current is provided through the first and second output terminals.

5. The lamp ballast of claim 1, the control circuit comprising circuitry effective to generate ON signals to one or more switching elements in response to a detected falling edge at the second node during a first half of a low frequency switching cycle and in response to a detected rising edge at the second node during a second half of the low frequency switching cycle.

6. The lamp ballast of claim 5, further comprising a sense resistor coupled to the negative rail,
the control circuit further comprising circuitry effective to generate OFF signals to the high frequency switching elements in response to a detected peak current through the sense resistor.

7. The lamp ballast of claim 6, the control circuit further comprising circuitry effective to generate OFF signals to the low frequency switching elements in response to a detected predetermined time lapse without an OFF signal being generated to the high frequency switching elements.

8. The lamp ballast of claim 5, the control circuit further comprising circuitry effective to generate OFF signals to one or more switching elements in response to a detected undervoltage condition at the second output terminal during the first half of the low frequency switching cycle and in response to a detected over-voltage condition at the second output terminal during the second half of the low frequency switching cycle.

9. A lamp ballast comprising:
a buck inverter circuit having a pair of high frequency switching elements and a pair of low frequency switching elements arranged in a full bridge configuration between positive and negative rails of the ballast;
a capacitor and an inductor coupled in series between a first node between the low frequency switching elements and a second node between the high frequency switching elements;
a first lamp output terminal coupled to the first node;
a second lamp output terminal coupled to a third node between the capacitor and the inductor;
a sense resistor coupled to the negative rail; and
a control circuit effective during an open circuit operation to
sense rising and falling edges of a voltage waveform at the second node,
generate ON signals to one or more switching elements in response to said sensed rising and falling edges,
sense one or more of a peak current through a current sensor and an over-voltage condition across the capacitor,
generate OFF signals to the high frequency switching elements in response to the one or more of said sensed peak current and said sensed over-voltage condition, and
generate OFF signals to the low frequency switching elements in response to a predetermined time elapsing without an OFF signal being generated to the high frequency switching elements,
wherein the buck inverter circuit operates in either of a critical discontinuous mode or a discontinuous mode during said open circuit operation.

10. The lamp ballast of claim 9, the control circuit effective during a first half of a low frequency waveform cycle associated with the open circuit operation to
sense a falling edge of a voltage waveform at the second node,
generate ON signals to a first low frequency switching element and a first high frequency switching element in response to said sensed falling edge,
sense one or more of a peak current through the current sensor and an over-voltage condition across the capacitor,
generate an OFF signal to the first high frequency switching element in response to the one or more of said sensed peak current and said sensed under-voltage condition, and
generate an OFF signal to the first low frequency switching element in response to a predetermined time elapsing without an OFF signal being generated to the first high frequency switching element.

11. The lamp ballast of claim 10, the control circuit effective during a second half of the low frequency waveform cycle associated with the open circuit operation to
sense a rising edge of the voltage waveform at the second node,
generate ON signals to a second low frequency switching element and a second high frequency switching element in response to said sensed rising edge,
sense one or more of a peak current through the current sensor and an over-voltage condition at the second lamp output terminal,
generate an OFF signal to the second high frequency switching element in response to the one or more of said sensed peak current and said sensed over-voltage condition, and
generate an OFF signal to the second low frequency switching element in response to a predetermined time elapsing without an OFF signal being generated to the second high frequency switching element.

12. The lamp ballast of claim 9, the control circuit further adapted to turn on and off the switching elements based on an inverter operation, wherein the buck inverter operates in a critical discontinuous mode during lamp startup, lamp run-up and stable lamp operations.

13. The lamp ballast of claim 12, wherein during the open circuit operation a low frequency square wave voltage is generated across the first and second output terminals, the low frequency square wave voltage regulated by the control circuit to be less than an input DC voltage from the positive rail.

14. The lamp ballast of claim 13, wherein during a lamp startup operation an ignition voltage is generated and superimposed on the low frequency square wave voltage.

15. The lamp ballast of claim 14, wherein during a lamp run-up operation which occurs after lamp breakdown a low frequency square wave current is provided through the first and second output terminals.

16. A method of controlling a buck inverter in a high-intensity discharge lamp ballast to regulate a voltage across first and second lamp output terminals during an open circuit operation, the method comprising the steps of:
(a) sensing rising and falling edges of a voltage waveform at a node between a pair of high frequency switching elements, the pair of high frequency switching elements along with a pair of low frequency switching elements arranged in a full bridge configuration and coupled between positive and negative inverter rails;
(b) generating ON signals to one or more switching elements in response to said sensed rising and falling edges;
(c) sensing one or more of a peak current through a current sensor coupled to the negative rail and a voltage fault condition at the second lamp output terminal;
(d) generating OFF signals to the high frequency switching elements in response to the one or more of said sensed peak current and said sensed voltage fault condition; and
(e) generating OFF signals to the low frequency switching elements in response to a predetermined time elapsing without an OFF signal being generated to the high frequency switching elements,
wherein the buck inverter circuit operates in either of a critical discontinuous mode or a discontinuous mode during said open circuit operation.

17. The method of claim 16, wherein steps (a) to (e) during a first half of a low frequency waveform cycle further comprising:
(a1) sensing a falling edge of a voltage waveform at the node between the pair of high frequency switching elements,
(b1) generating ON signals to a first low frequency switching element and a first high frequency switching element in response to said sensed falling edge;
(c1) sensing one or more of a peak current through the current sensor and an under-voltage condition at the second lamp output terminal;
(d1) generating an OFF signal to the first high frequency switching element in response to the one or more of said sensed peak current and said sensed under-voltage condition, and
(e1) generating an OFF signal to the first low frequency switching element in response to a predetermined time elapsing without an OFF signal being generated to the first high frequency switching element.

18. The method of claim 17, wherein steps (a) to (e) during a second half of the low frequency waveform cycle further comprising:
- (a2) sensing a rising edge of a voltage waveform at the node between the pair of high frequency switching elements,
- (b2) generating ON signals to a second low frequency switching element and a second high frequency switching element in response to said sensed rising edge;
- (c2) sensing one or more of a peak current through the current sensor and an over-voltage condition at the second lamp output terminal;
- (d2) generating an OFF signal to the second high frequency switching element in response to the one or more of said sensed peak current and said sensed over-voltage condition, and
- (e1) generating an OFF signal to the second low frequency switching element in response to a predetermined time elapsing without an OFF signal being generated to the second high frequency switching element.

19. The method of claim 18, further wherein a low frequency square wave voltage less than input DC voltage from the positive inverter rail is generated across the first and second lamp output terminals.

20. The method of claim 19, further comprising the step of initiating a lamp startup operation wherein an ignition voltage sufficient to ignite a high-intensity discharge lamp is generated and superimposed on the low frequency square wave voltage across the first and second lamp output terminals, the inverter in said lamp startup operation controlled to operate in a discontinuous mode.

* * * * *